Aug. 17, 1954  W. M. NICHOLS  2,686,514
COMBUSTION CHAMBER
Filed Sept. 28, 1953

WILLIAM M. NICHOLS.
*INVENTOR.*

BY
ATTORNEY

Patented Aug. 17, 1954

2,686,514

UNITED STATES PATENT OFFICE 2,686,514

COMBUSTION CHAMBER

William M. Nichols, Schenectady, N. Y., assignor to American Locomotive Company, New York, N. Y., a corporation of New York Application September 28, 1953, Serial No. 382,759

7 Claims. (Cl. 123—191)

This invention relates to a combustion chamber and more particularly to a combustion chamber for an internal combustion engine of the class which has at least two inlet valves for the admission of air to the cylinders. The invention is applicable to cylinders of the overhead valve type and may be employed with engines operating on either the two or four stroke cycle.

One of the most important objectives in the designing of internal combustion engines of the Diesel class is to improve fuel combustion. It has long been known that combustion is improved in such engines if the inlet air is introduced into the cylinder in a state of rapid rotational swirl about the axis of the cylinder. To foster this effect resort has been had to various devices. For example, in one common design the valve is offset from the center line. In another, the valve head has been provided with a shroud extending around about one-half of its periphery to direct the air into the combustion chamber. Valve lift problems resulting from such a design has, however, led to a compromise arrangement in which the shroud has been disposed on the cylinder head instead of on the valve. Another means of creating the desired swirl has been to form the valve seat so that the flow of air is controlled. All of these constructions have been designed, however, solely to give the entering air a swirling course. Applicant believes that improved combustion results if minor or secondary eddies are created in the swirling air. No attempt has been made to do this in the prior art so far as applicant is aware.

The main object of the present invention is to provide an improved combustion chamber which is so shaped that it creates minor eddies in addition to a swirl in the air entering the combustion chamber.

Another object of the invention is to provide an improved combustion chamber specifically for use with an internal combustion engine of the class which employs at least two air inlet valves, such chamber being so constructed as to direct combustion supporting air into the cylinder in a manner in which there are created both swirl and eddies superimposed on the swirl.

A further object is to accomplish the foregoing result without resort to shrouds either on the valve head or cylinder head.

Other and further objects of the present invention will be apparent from the following description, the accompanying drawings, and the appended claims.

Figure 1:
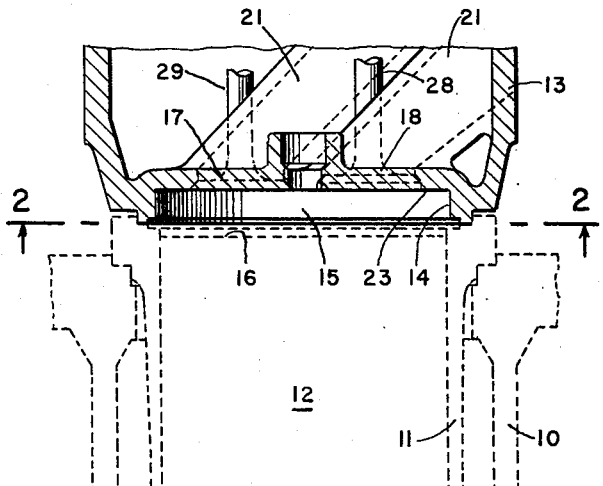
Fig. 1 is a partial elevational cross section showing the combustion chamber.

Referring now to Fig. 1 engine block 10 has a cylinder liner 11 within which piston 12 reciprocates. Cylinder head 13 has a recess 14 which forms the upper part of the combustion chamber 15, the remainder of which is defined by the top face 16 of piston 12 and by liner 11.

Two inlet valves 17 and 18 and two exhaust valves 19 and 20 are arranged to reciprocate in recess 14. Two exhaust valves are shown and are preferred although one may be sufficient. Combustion supporting air is directed by passages 21 into the combustion chamber as valves 17 and 18 open in conventional manner.

Figure 3:
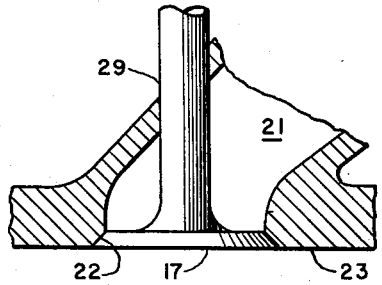
Fig. 3 is an enlarged cross section on line 3—3 of Fig. 2.

Valve seat 22, which is beveled into the ceiling 23 of recess 14, is tapered uniformly throughout its periphery as seen in Fig. 3 and is considered as being formed directly in the cylinder head. Accordingly, as soon as the valve is given a downward or opening movement, the incoming air is distributed evenly around the periphery of the valve head and spills uniformly past seat 22 and into the combustion chamber. Valve seat 24, which is also beveled into the recess ceiling 23, is likewise tapered uniformly throughout its periphery. However, valve seat 24 is not formed directly in the cylinder head in the same sense as seat 22 since it is disposed above a rebated recess 25. Rebated recess 25, adjacent seat 24, extends coaxially with valve 18 and extends around about 180° of its periphery. This portion of the rebate has a radius substantially equal to that of the valve head. The remaining portion 26 of the rebate 25 is cut outwardly away from the valve approximately at a slope which is twice that of the taper of seat 24. A channel 27 which merges into rebate 25 is thus formed in the cylinder head to guide the flow of incoming air into the combustion chamber in a direction away from the rebate portion 25. As valve 18 opens and moves downwardly away from its seat, the rebate portion 25 remains close to the valve head so that air is prevented from spilling into the chamber throughout the angle covered by said portion during that part of the valve opening movement in which the valve head clears the rebate. But as soon as the valve begins to open, the remaining portion or channel 27 permits the incoming air to spill through the channel.

Figure 2:
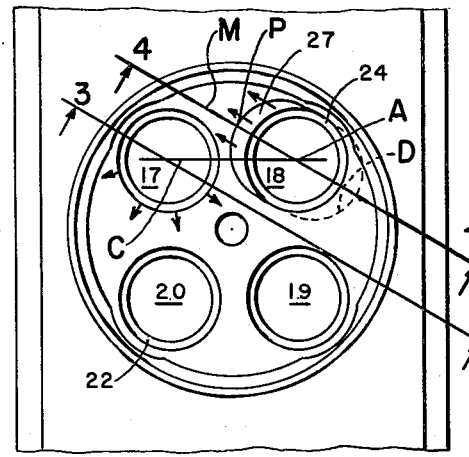
Fig. 2 is a plan view on the line 2—2 of Fig. 1.
Figure 4:
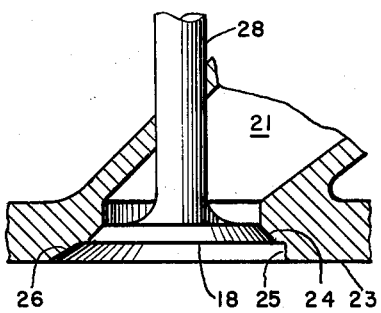
Fig. 4 is an enlarged cross section on line 4—4 of Fig. 2.

Channel 27, in a working embodiment, is so directed that the incoming air flows toward the adjacent inlet valve 17 at an angle of substantially 25° or, in other words, the air path is substantially tangent to the cylinder. That is to say that the plane M, which intersects the axis A of the valve stem 28 and the mid-point P of the channel margin is at an angle of 25° from the plane C which intersects the axes of valve stems 28 and 29. By such an arrangement, the spill of air entering from valve 18 through channel 27, as indicated by the parallel arrows, encounters the uniform spill of air from the periphery of valve 17 which is indicated by the radial arrows. The air spill past valve 18 through channel 27 follows the cylinder wall counterclockwise as seen in Fig. 2 and creates a swirling rotational course around the combustion chamber. The interposition of the uniform spill of incoming air from valve 17, however, causes the latter to cut across such swirling air to create eddies as desired.

Although channel 27, arranged at a 25° angle as heretofore described, provides a satisfactory impingement of the incoming air from valve 17 across the incoming air from valve 18, it is not essential that the angle be so limited. The angular relation will vary with different engine characteristics. For example, a satisfactory working arrangement is produced if the channel is disposed in the opposite direction as defined by dotted line D since such a disposition provides tangential entry of the incoming air in such manner that it proceeds around the combustion chamber. Of course, in the latter case, the path of such air is clockwise. However, the incoming air from valve 17 still cuts across the rotating air mass as previously described to set up eddies superimposed upon the swirl.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. A combustion chamber for an internal combustion engine comprising a cylinder, a piston, a cylinder head, and exhaust means, said cylinder head having at least two adjacent inlet valves therein offset from the cylinder axis, valve openings having seats in the cylinder head for said valves, one of said valve openings having a seat that is circular and the other of said valve openings alone having a rebated portion immediately adjacent the valve seat cut away towards one side to afford a preferential path for the air substantially tangent to the cylinder.

2. A combustion chamber for an internal combustion engine comprising a cylinder, a piston, a cylinder head, and exhaust means, said cylinder head having at least two adjacent inlet valves therein offset from the cylinder axis, valve openings having seats in the cylinder head for said valves, one of said valve openings having a seat that is circular and the other of said valve openings alone having a rebate portion immediately adjacent the valve seat cut away towards the first valve to afford a preferential path for the air towards the first valve.

3. A combustion chamber for an internal combustion engine comprising a cylinder, a piston, a cylinder head, and exhaust means, said cylinder head having at least two adjacent inlet valves therein offset from the cylinder axis, valve openings having seats in the cylinder head for said valves, one of said valve openings having a seat that is circular and the other of said valve openings alone having a rebated portion immediately adjacent the valve seat cut away for substantially 180° towards one side to afford a preferential path for the air.

4. A combustion chamber for an internal combustion engine comprising a cylinder, a piston, a cylinder head, and exhaust means, said cylinder head having at least two adjacent inlet valves therein offset from the cylinder axis, valve openings having seats in the cylinder head for said valves, one of said valve openings having a seat that is circular and the other of said valve openings alone having a rebated portion immediately adjacent the valve seat cut away for substantially 180° towards the first valve, the edge of the cut away portion being tangent to the cylinder to afford a preferential path for the air towards the first valve.

5. A combustion chamber for an internal combustion engine comprising a cylinder, a piston, a cylinder head, and exhaust means, said cylinder head having at least two adjacent inlet valves therein offset from the cylinder axis, valve seats in the cylinder head for said valves, only one of said valve seats being formed directly in the cylinder head, the other of said valve seats being formed in a rebated portion in the cylinder head, said rebated portion being cut away adjacent the valve seat towards one side to afford a preferential path for the air substantially tangent to the cylinder.

6. A combustion chamber for an internal combustion engine comprising a cylinder, a piston, a cylinder head, and exhaust means, said cylinder head having at least two adjacent inlet valves therein offset from the cylinder axis, valve seats in the cylinder head for said valves, only one of said valve seats being formed directly in the cylinder head, the other of said valve seats being formed in a rebated portion in the cylinder head, said rebated portion being cut away for substantially 180° adjacent the valve seat toward said first valve.

7. A combustion chamber for an internal combustion engine comprising a cylinder, a piston, a cylinder head, and exhaust means, said cylinder head having at least two adjacent inlet valves therein offset from the cylinder axis, valve seats in the cylinder head for said valves, only one of said valve seats being formed directly in the cylinder head, the other of said valve seats being formed in a rebated portion in the cylinder head, said rebated portion being cut away for substantially 180° adjacent the valve seat towards said first valve, the edge of the cut away portion being tangent to the cylinder to afford a preferential path for the air towards the first valve.

References Cited in the file of this patent

UNITED STATES PATENTS

| Number | Name | Date |
|---|---|---|
| 1,733,696 | Ricardo | Oct. 29, 1929 |

FOREIGN PATENTS

| Number | Country | Date |
|---|---|---|
| 801,538 | France | Aug. 6, 1936 |
| 926,536 | France | Oct. 3, 1947 |
| 589,642 | Great Britain | June 25, 1947 |